(12) United States Patent
Knuettel

(10) Patent No.: US 10,989,920 B2
(45) Date of Patent: Apr. 27, 2021

(54) OPTICAL SYSTEM

(71) Applicant: agrippa Holding & Consulting GmbH, Mölsheim (DE)

(72) Inventor: Alexander Knuettel, Viernheim (DE)

(73) Assignee: AGRIPPA HOLDING & CONSULTING GMBH, Mölsheim (DE)

(*) Notice: Subject to any disclaimer, the term of this patent is extended or adjusted under 35 U.S.C. 154(b) by 225 days.

(21) Appl. No.: 15/773,753

(22) PCT Filed: Oct. 4, 2016

(86) PCT No.: PCT/DE2016/200461
§ 371 (c)(1),
(2) Date: Nov. 1, 2018

(87) PCT Pub. No.: WO2017/076404
PCT Pub. Date: May 11, 2017

(65) Prior Publication Data
US 2019/0049731 A1 Feb. 14, 2019

(30) Foreign Application Priority Data

Nov. 5, 2015 (DE) ............... 10 2015 221 774.4

(51) Int. Cl.
*G03H 1/00* (2006.01)
*G02B 27/01* (2006.01)
(Continued)

(52) U.S. Cl.
CPC ........ *G02B 27/0172* (2013.01); *G02B 5/32* (2013.01); *G02B 27/0093* (2013.01);
(Continued)

(58) Field of Classification Search
CPC ............ G02B 27/0093; G02B 27/0172; G02B 27/0101; G02B 27/0174; G02B 27/4205;
(Continued)

(56) References Cited

U.S. PATENT DOCUMENTS 5,917,459 A * 6/1999 Son ................. G02B 27/0103
 345/7
7,350,922 B2 4/2008 Seo et al.
(Continued)

FOREIGN PATENT DOCUMENTS

DE 698 20 363 2/2005
EP 2 918 402 9/2015
(Continued)

OTHER PUBLICATIONS

International Search Report dated Apr. 19, 2017 in International (PCT) Application No. PCT/DE2016/200461.
(Continued)

*Primary Examiner* — Audrey Y Chang
(74) *Attorney, Agent, or Firm* — Wenderoth, Lind & Ponack, L.L.P.

(57) ABSTRACT

The invention relates to an optical system for generating a two- or three-dimensional image, the system comprising: a projection apparatus for optically transmitting image information to at least one user; an eye detection apparatus; and an imaging apparatus for imaging the image information of the projection device, so that the user can perceive said image information. The imaging apparatus comprises at least one optical hologram set, at least one of which sets is designed to be angle-amplifying. Using the projection apparatus, at least one virtual optical point is generated, or a plurality of optical points are generated such that they form at least one optical wave front, each virtual optical point being generated by the superposition of at least two coherent
(Continued)

Figure 1:
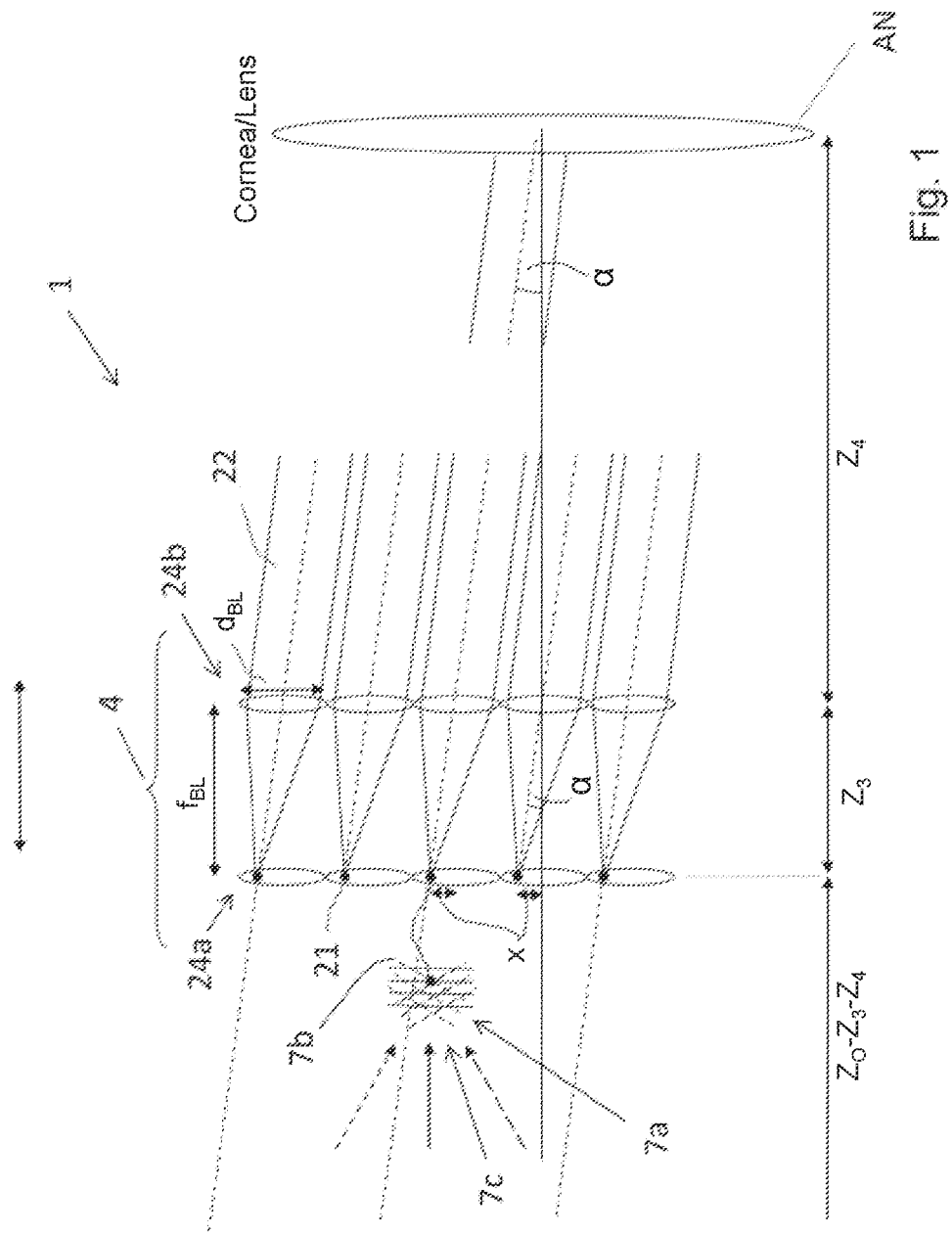

light waves in the region of the at least one angle-amplifying optical hologram set, and the at least one optical hologram set is used to image the at least one virtual point or the at least one optical wavefront onto the eyes of the at least one user. The respective movements of the eyes of the at least one user can be detected by the eye detection apparatus and the latter cooperates with the projection apparatus in such a way that the amount of image information is adapted according to the respective alignment of the eye and/or position of the eye in different perception regions of each eye.

19 Claims, 10 Drawing Sheets

(51) Int. Cl.
| | |
|---|---|
| *G02B 5/32* | (2006.01) |
| *G03H 1/22* | (2006.01) |
| *G02B 27/00* | (2006.01) |
| *G02B 27/42* | (2006.01) |
| *G03H 1/02* | (2006.01) |
| *G02B 30/50* | (2020.01) |
| *G02B 30/56* | (2020.01) |

(52) U.S. Cl.
CPC ......... *G02B 27/4205* (2013.01); *G02B 30/50* (2020.01); *G02B 30/56* (2020.01); *G03H 1/0248* (2013.01); *G03H 1/2205* (2013.01); *G03H 1/2294* (2013.01); *G02B 2027/0107* (2013.01); *G02B 2027/0174* (2013.01); *G03H 2001/221* (2013.01); *G03H 2001/2239* (2013.01); *G03H 2226/05* (2013.01)

(58) Field of Classification Search
CPC ............... G02B 30/50; G02B 20/56; G02B 2027/0107; G02B 2027/0174; G03H 1/0005; G03H 1/0248; G03H 2001/2239; G03H 2226/05; G03H 1/2205; G03H 1/2294; G03H 2001/221
USPC ............... 359/13, 15, 630; 345/7, 8
See application file for complete search history.

(56) References Cited

U.S. PATENT DOCUMENTS

| | | | |
|---|---|---|---|
| 9,341,846 B2* | 5/2016 | Popovich | G02B 27/0103 |
| 2010/0097580 A1* | 4/2010 | Yamamoto | G02B 26/101 |
| | | | 353/69 |
| 2015/0116798 A1 | 4/2015 | Smithwick | |
| 2015/0277117 A1 | 10/2015 | Yamada et al. | |
| 2016/0041384 A1* | 2/2016 | Robbins | G02B 27/017 |
| | | | 345/156 |

FOREIGN PATENT DOCUMENTS

| | | |
|---|---|---|
| WO | 2010/057219 | 5/2010 |
| WO | 2013/079622 | 6/2013 |

OTHER PUBLICATIONS

Arines, "Pupil tracking with a Hartmann-Shack wavefront sensor", Journal of Biomedical Optics, vol. 15, No. 3, May/Jun. 2010, pp. 036022-1 to 036022-7.

Written Opinion dated Apr. 19, 2017 in International (PCT) Application No. PCT/DE2016/200461.

* cited by examiner

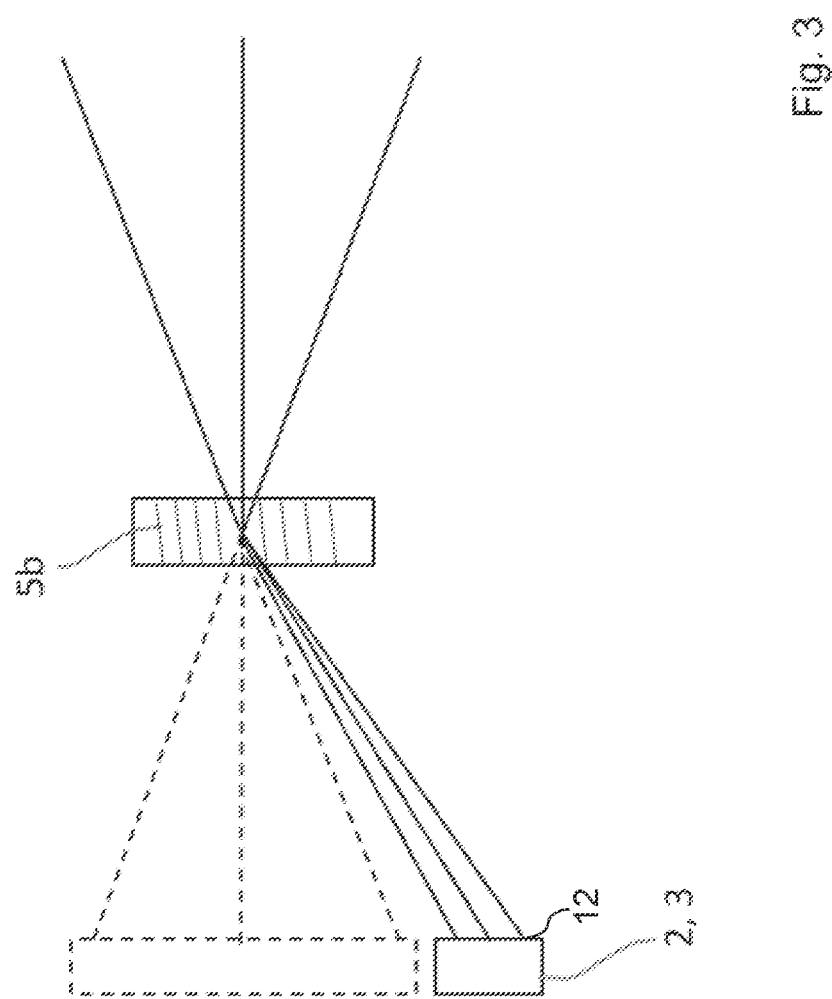

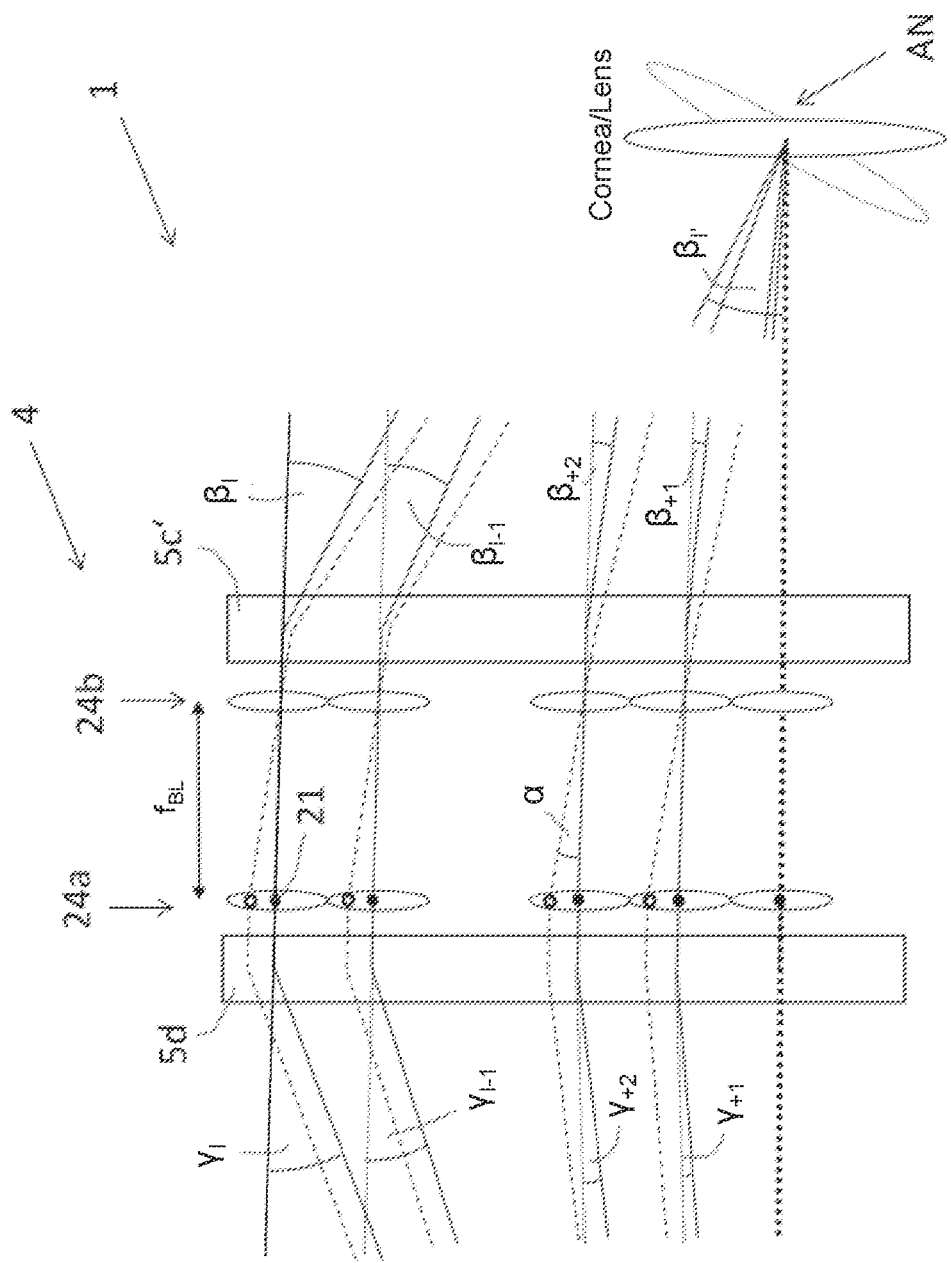

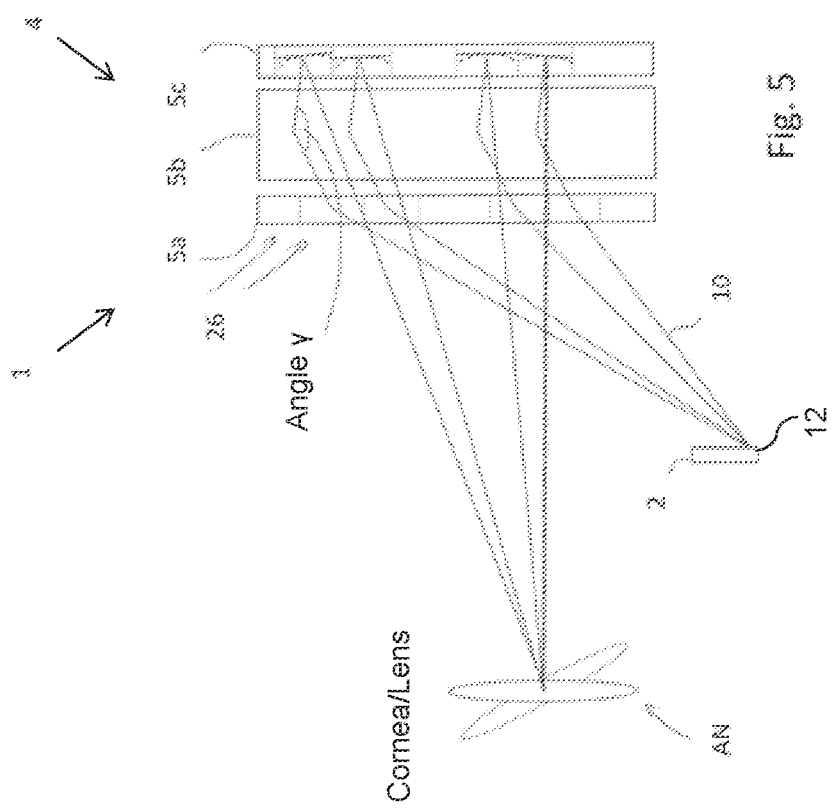

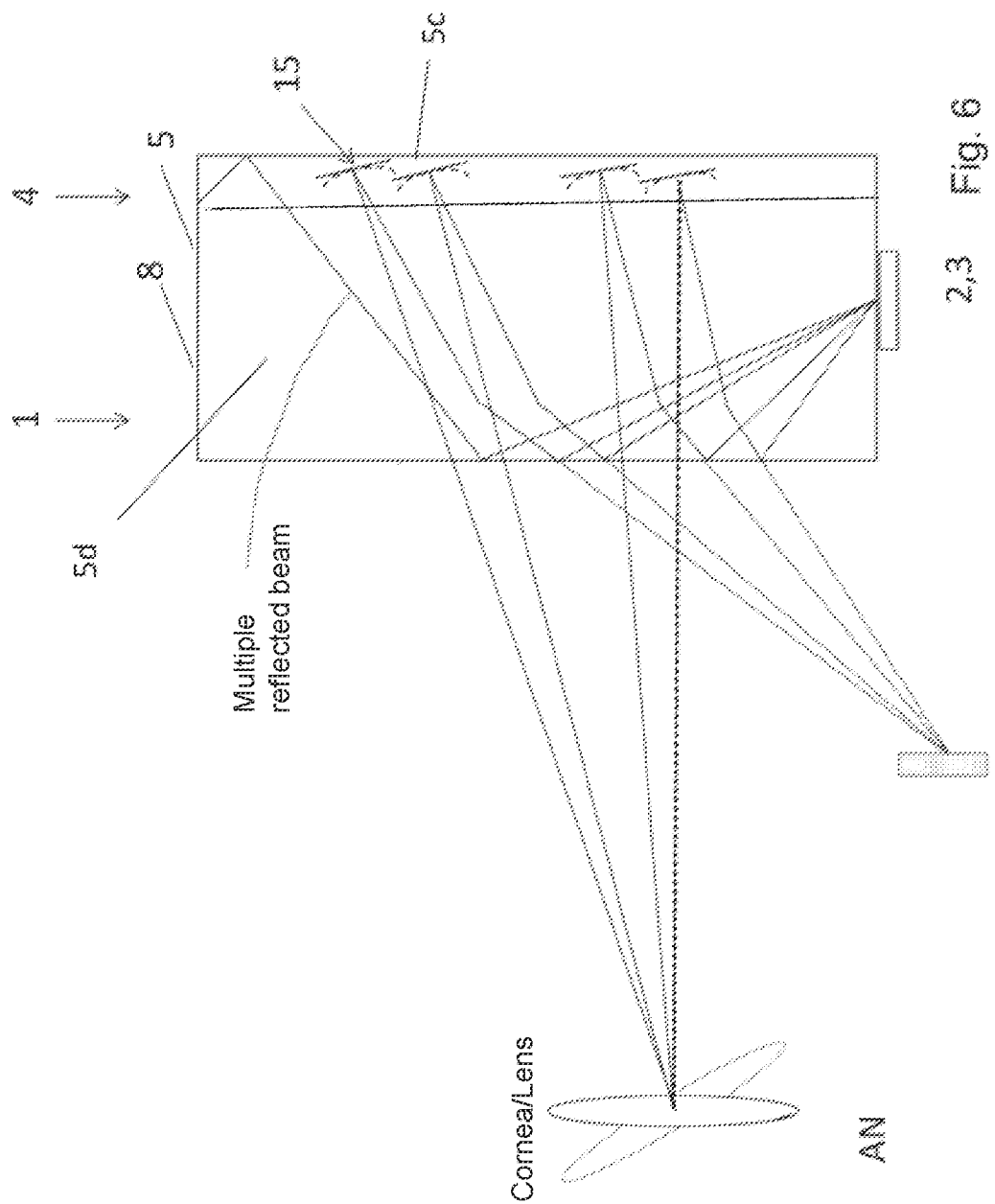

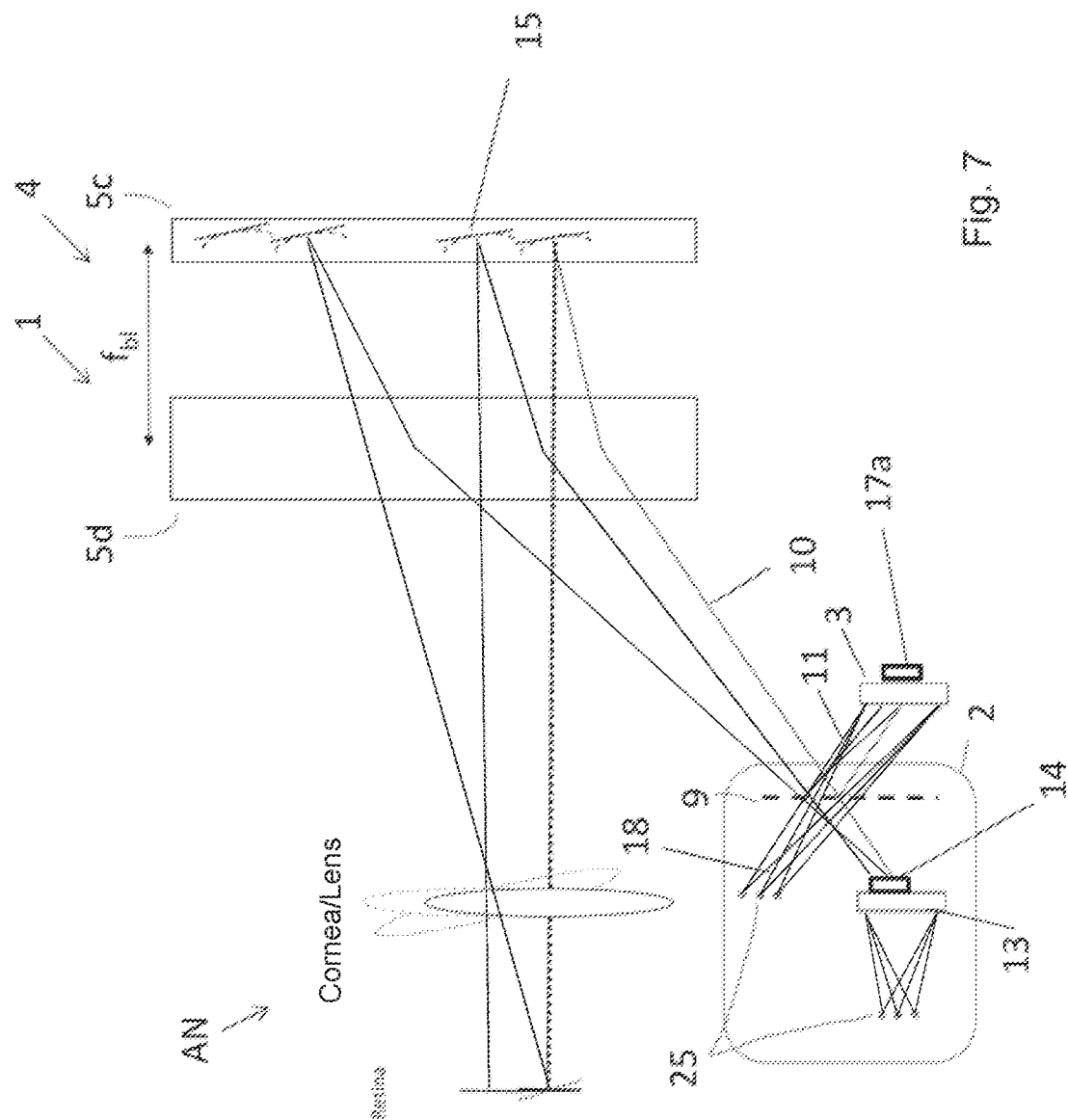

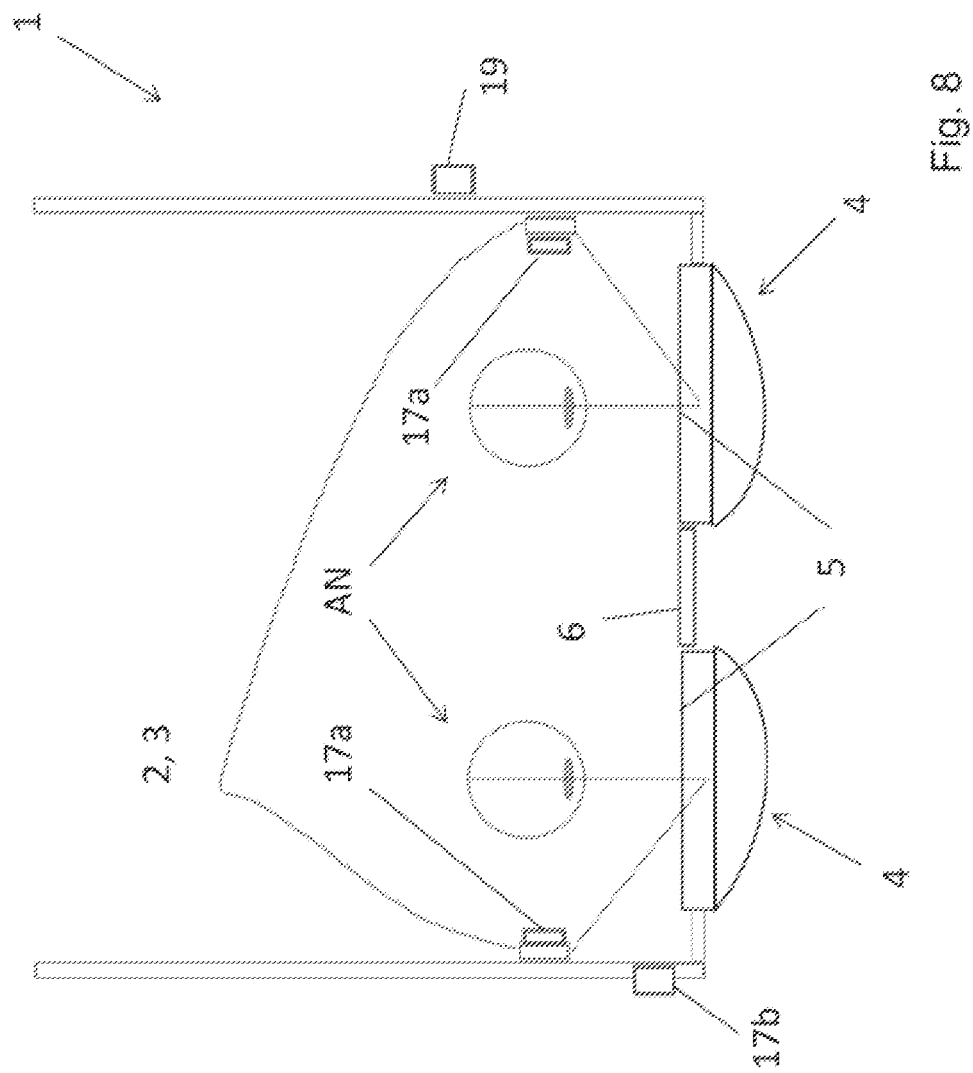

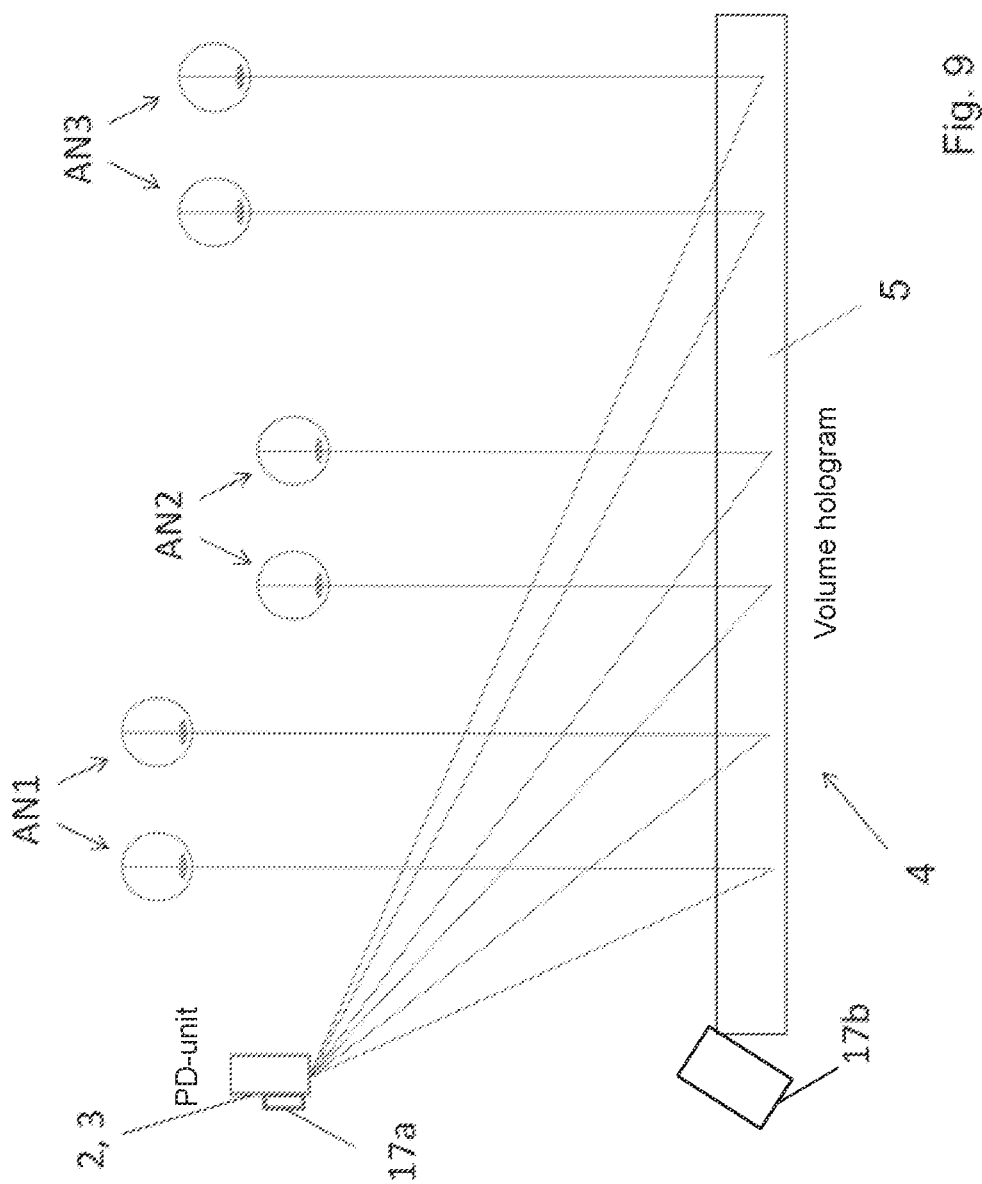

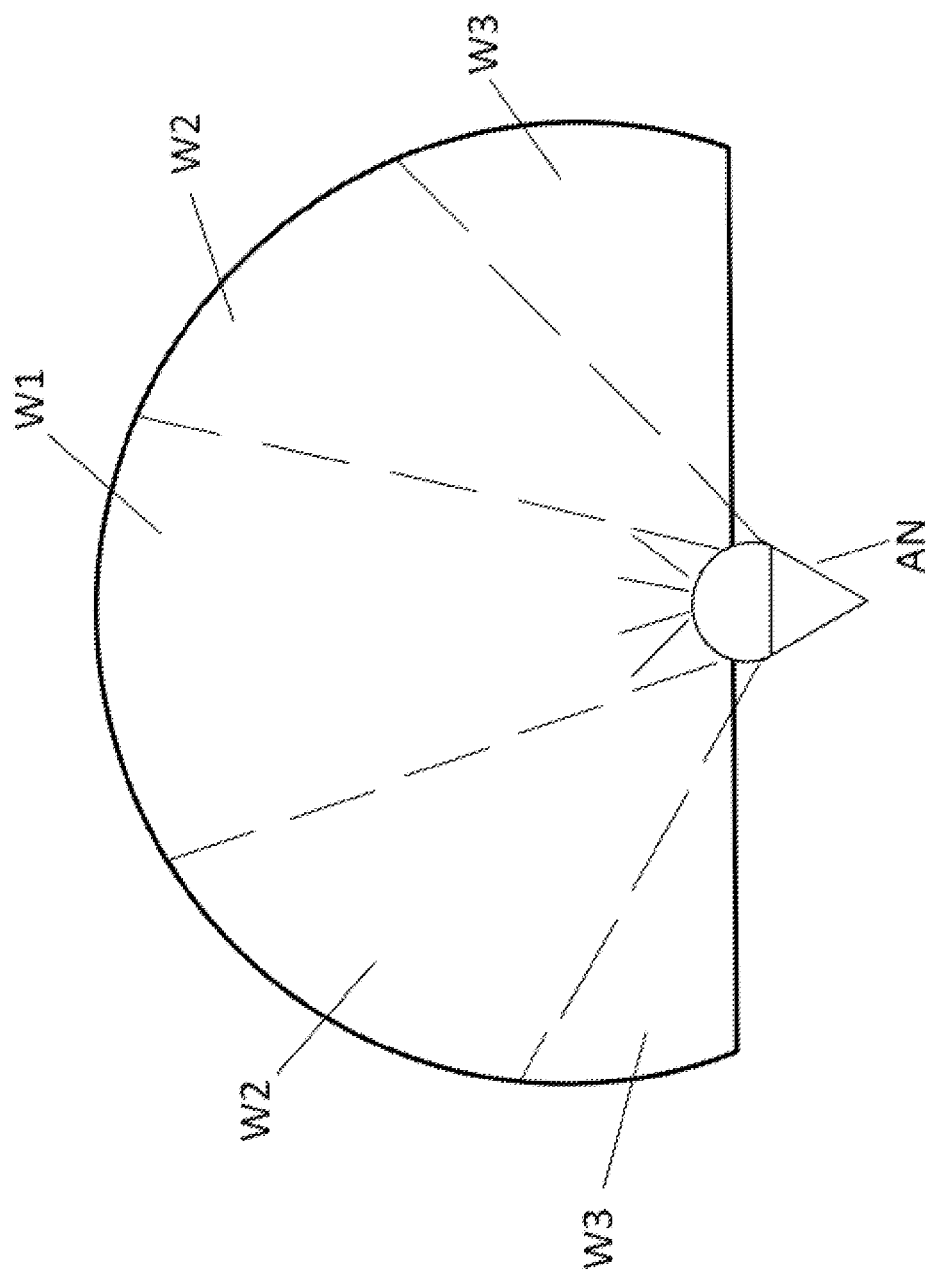

OPTICAL SYSTEM

This invention concerns an optical system for generating a two- or three-dimensional image.

This invention also concerns a process for producing a two- or three-dimensional image.

Although this invention can be used for both two-dimensional and three-dimensional images, it is explained in relation to three-dimensional images.

Methods and devices for displaying three-dimensional images have become known, for example, from DE 698 20 363 T2, U.S. Pat. No. 7,350,922 B2 and U.S. Pat. No. 5,917,459.

To be able to perceive optical information through one eye, the light must first pass through the so-called cornea and the eye lens. This is then bundled into a light spot and detected by the rods and cones on the retina. The diameter of the light beam is influenced by the iris. In order to achieve the greatest possible resolution, the iris must become as large as possible. With a larger iris diaphragm, however, the aberrations caused by comes and lens also increase; therefore the resolution decreases with a larger diaphragm.

With a pupil diameter of approx. 2 mm—this corresponds to a normal daylight situation—the lateral resolution on the retina is optimal and is approx. 0.25 mrad. The anatomy of the retina allows sharp vision in an inner area called Fovea Centralis near the anatomical optical axis with a diameter of about 2 mm and a field of view angle of 60 or 100 mrad. This area is usually used for focused vision, such as reading. The peripheral field of view is about 120° or 2000 mrad and allows only the observation of contours. However, this area is important for the perception of three-dimensional images, as it is in the perception of fast movement.

In order to see three-dimensionally without fatigue, each eye must a) focus on an object point via accommodation of the lens
i.e., optically focus on the object point, and b) both eyes must be directed to a point via the parallax. Distances from infinite to the so-called hyperfocal distance require little or only minimal accommodation. Accommodation, i.e., a smaller lens focal length is only required at even shorter distances. This hyperfocal distance is typically 4 meters. At a young age, the accommodation can be up to a distance of 10 cm; however, the ability to accommodate usually decreases with age, i.e., the distance then increases.

In order to convey a three-dimensional spatial impression, it has become known to use stereoscopy to give images a spatial impression of depth that is physically non-existent. In stereoscopic viewing, each eye is offered an appropriate directional perspective of the object, depending on the distance of the object. Although the parallax is correct, the focus is usually not.

However, since the image is formed on a lighting screen, which is usually a fixed distance from the viewer, the accommodating ability of the eye cannot be utilized, resulting in fatigue.

Thus, to enable realistic three-dimensional view, it is necessary to project a three-dimensional object into space and not just onto a planar, two-dimensional surface such as a lighting screen. It has already become known to use a hologram. Currently, common holograms are merely static, i.e., possible with direct holographic exposure.

For moving images, however, an enormous amount of data has to be accepted:

a) A spectacle lens is formed in the form of a hologram, with a simplified area of 30×30 mm². At a full viewing angle of +/−60°, a complex amplitude information with a total of $4*10^9$ samples per image is required. At 8-bit resolution per pixel, 3 colors and 100 Hz repetition rate, the data rate is about $10^{13}$ bit/s (or 10,000 Gb/s). The maximum data transfer rate currently possible is 50 Gb/s, i.e., a factor of 200 lower than the required data rate, so that the display of moving images is technically impossible with systems commonly used today.

b) A projection glass is in the form of a hologram with a simplified area of 1×1 m². At a full viewing angle of +/−60°, a complex amplitude information with a total of $4*10^{12}$ samples per image is required. Compared to the application a) above, another factor of 1000 higher data rate—i.e., $10^7$ Gb/s—would be required.

It has already become known from the US 2010/0060551 to provide an ophthalmic lens with a concave mirror, whereby the concave mirror is formed by a volume hologram. If this concave mirror has the focal length f, the input angle can be translated at a distance of 2f into an exactly equal output angle as the viewing angle for the eye. If the eye is at this conjugated point, the space required for a projection unit for a three-dimensional image is small because only the beam cross-section has to be rotated accordingly. With lateral displacement, the space requirement increases accordingly.

However, the disadvantage is that point scanning is carried out sequentially via a deflection mirror. The pupil must be exactly in the conjugated point of the scanning mirror, otherwise the light will not reach the pupil.

If the interpupillary distance to the next position changes, the position of the scanning mirror must also change. In this respect, the flexibility of the system shown in US 2010/0060551 is considerably limited. Furthermore, a three-dimensional moving display of an image is not possible because the scanning or sequential focusing is too slow.

The WO 2014/115095 shows a holographic, transflective screen that reflects light from a projection system. The screen shall comprise at least one volume hologram and first and second protective elements adapted to be in contact with the volume hologram and the volume hologram being interposed therebetween. For example, the transflective holographic screen is designed as a so-called HUD (Head-Up Display). The volume hologram or volume holograms take over the function of a microlens arrangement.

FIG. 4 of WO 2014/115095, in particular, shows that each of these microlenses of the microlens arrangement is controlled sequentially via a rotary mirror 107—raster scanning. From the individual holographic elements, the microlenses, the light is diffusely reflected towards the eye of a respective viewer.

The disadvantage here is that a user needs a bifocal contact lens—special contact lens 501—if he wants to view the content on the screen and it is held in a spectacle lens. Furthermore, only two-dimensional flat screen information can be displayed; a three-dimensional representation is not possible because the focal length of the holographic elements is too small. The device is also ineffective overall since the pupil is only in a small solid angle of the emitted light and therefore a high proportion of light remains unused.

One task of the present invention is therefore to provide a device and a method for generating a two- or three-dimensional image, which makes information spatially representable in two or three dimensions.

In addition, the device or the process should be flexible in use and enable a realistic three-dimensional representation of moving images, and the process or the device should be as compact as possible in terms of its installation space.

The present invention solves the tasks with an optical system for generating a two- or three-dimensional image, comprising a projection device for the optical transmission of image information to at least one user, an eye detection device, and an imaging device for imaging the image information of the projection device for perception by the at least one user,
wherein the imaging device comprises
at least one optical hologram set, wherein
at least one of the optical hologram sets is angularly amplified and at least one angularly amplified hologram set comprises at least two holograms and at least two holograms interact to provide the angular amplification, and wherein
at least one of the optical hologram sets is at least partially transmitting and/or at least partially reflecting, preferably at least 90% reflecting,
wherein
by means of the projection device
at least one virtual optical point is generated, or
a plurality of virtual optical points is generated such that they form at least one optical wavefront,
wherein a virtual optical point can be generated by superimposing at least two coherent light waves in the region of at least one angle-enhancing optical hologram set
and
wherein
by means of at least one optical hologram set which can image at least one virtual point or at least one optical wavefront onto the respective eyes of at least one user, and
whereby
the respective movement of the eyes of at least one user is detectable by means of the eye detection and the eye detection means cooperates with the projection means in such a way that the amount of image information is adapted according to the respective eye direction and/or
eye position in different perception areas of the respective eye.

This invention also solves the tasks with a process for producing a two- or three-dimensional image,
wherein
at least one of the optical hologram sets is angularly amplified and at least one angularly amplified hologram set comprises at least two holograms, wherein at least two holograms cooperate to provide angular gain, and wherein,
at least one of the optical hologram sets is at least partially transmitting and/or at least partially reflecting, preferably at least 90% reflecting, and
wherein
a minimum of one virtual optical point or
a plurality of virtual points is generated in such a way that they form a minimum of one wavefront,
by superimposing at least two coherent light waves in the region of the optical hologram set formed to amplify the angle, wherein by means of at least one optical hologram set the minimum of one virtual point or at least one optical wavefront are imaged onto the respective eyes of a minimum of one user and
wherein the respective movement of the eyes of that one user is detected and the amount of image information is adapted according to the respective eye direction and/or eye position in different perception regions of the respective eye.

One of the advantages of this is that the data rate at which information for three-dimensional representation must be projected onto the imaging device for a user can be significantly reduced: By means of the eye detection device it is possible to detect the exact direction and position of the eye and to adjust the image resolution accordingly such that it is lower, for example, at the edges of the perception area than in the middle.

It is also possible to make the device correspondingly more compact, for example, so that it can be easily integrated into a spectacle frame for a user. A very compact design is possible, especially by means of the angle-enhancing holograms, because—compared to already known projection devices—a small or smaller aperture is possible for these.

Another advantage is that it enables a true three-dimensional representation, not only of static images but also—especially due to the lower data rates required for this compared to the state of the art—for moving images such as films or the like.

In addition to the flexibility with regard to implementability due to a possible compact design, it is also possible with a single optical system, for example by means of a larger imaging device, to provide a particularly three-dimensional moving image for several users in an optimal manner. For this purpose, the eye movements of each individual user are monitored by the eye detection device and the projection device then projects the image information accordingly onto the imaging device so that it can selectively generate a corresponding three-dimensional image for perception of the respective user.

The term "hologram set" means, in particular in the description, preferably the claims, one or more holograms which are preferably arranged next to and/or at least in or above one another in the sense of a superimposition.

A hologram can be designed as a volume hologram, especially in the description, preferably the claims.

The term "angle-enhancing" in relation to a hologram set is to be understood in particular in the description, preferably the claims, as a hologram set which comprises at least two holograms.

Each provide a beam angle for at least two incident light beams onto the hologram set with certain beam angles, the difference in the beam angle being greater than the difference of the angle of incidence. Preferably, the differences differ by at least the factor 2, factor 5, particularly by the factor 10. This means that a large beam angle spectrum can be provided with a small angle of incidence spectrum.

The term "neutral angle gain" in relation to a hologram set is to be understood in particular in the description, preferably the claims, as a hologram set which does not have an angle-enhancing effect or works: two light beams incident on the hologram set with certain beam angles and corresponding beam angles are provided by the hologram set in such a way that the difference in the beam angles essentially corresponds to the difference in the angles of incidence.

The term "thick" in relation to a hologram is to be understood particularly in the description, preferably the requirements, as a hologram which has an extension, i.e., thickness, of between approx. 100 μm and approx. 3 mm, in particular between 1 mm and 2 mm, in the straight line of sight of a user.

The term "thin" in relation to a hologram is to be understood particularly in the description, preferably the claims, to mean a hologram which, in the straight line of vision of a user, has a thickness of a few 10 μm to 50 μm, preferably between 20 µm and 30 µm. In particular, two "thin" hologram sets in total may have the thickness of a "thick" hologram set.

The term "transmitting" or "reflective" in relation to a hologram set is to be understood particularly in the description, preferably the claims, as at least one hologram of a hologram set which works essentially transmitting or essentially reflecting. Essentially transmitting means that at least a part, preferably at least 50%, particularly at least 80%, and most preferably at least 90% of the light Irradiated onto the hologram set transmits through the hologram of the hologram set. Essentially reflective here means that at least a part, preferably at least 50%, especially at least 80%, and most preferably at least 90% of the light Irradiated onto the hologram of the hologram set is reflected.

The term "perceptual areas" in relation to an eye is to be understood in particular in the description, preferably the claims, as different (space) angular ranges in which the eye perceives an object or the like in different resolutions. For example, a narrow solid angle range with the highest resolution is perceived along the viewing direction, which is imaged in the eye on the fovea centralis.

Further features, advantages and preferred designs of the invention are described in or become apparent from the following subclaims.

Preferably, the projection device is connected to the imaging device by at least one optical waveguide. This enables a conceptually particularly simple transfer of the image information from the projection device to the imaging device. In this context, optical waveguide means, in particular, an "optical waveguide".

Ideally, the projection device and the eye detection device are designed as a projection/detection unit, preferably wherein the projection/detection unit comprises at least one beam splitter for splitting the projection beam path and the detection beam path of the projection/detection unit. This makes it possible, for example, to arrange the projection device and detection device in a common housing to save space. It is particularly useful if the projection beam path and detection beam path outside the projection/detection unit have the same path. These can then
be divided very easily within the projection/detection unit by means of a beam splitter.

An aperture of the projection and/or eye detection device is advantageously smaller than 10 mm, in particular smaller than 5 mm, preferably smaller than 3 mm.

With a sufficient opening for the projection/detection unit, a compact design of the projection/detection unit can be achieved, so that it can be arranged, for example, in or on a spectacle frame.

Ideally, the projection device comprises at least one amplitude/phase modulator or one or more phase modulators, wherein a plurality of modulators are arranged together in a module. By means of a pixel-based amplitude/phase modulator, in which pixel sizes in the micrometer range are particularly advantageous, the respective image information can be reliably transmitted to the imaging device in accordance with the orientation of the eyes. Also alternatively, a pure phase modulator or two or more phase modulators can be used. The latter, for example, is combined into a module, that spatially adjacent or conjugated phase values are then preferably formed in such a way that they simulate an amplitude value corresponding to a phase value, i.e., generate it synthetically. Such pure phase modulators or corresponding combinations are generally known to experts as "spatial light modulators".

Advantageously, the at least one phase modulator or module comprises one or more lenses arranged at an output of at least one phase modulator or module. Using a lens and/or lens group with several lenses, larger pixel expansions are then also possible in the phase modulator, for example between 2 µm and 6 µm, which can then be optically reduced to approx. 1 µm using the lens or lenses.

Ideally, the imaging device comprises a minimum of two optical hologram sets, wherein at least one of the optical hologram sets is angle-amplifying and at least one of the optical hologram sets is designed to not be angle-amplifying. This allows an angular gain to be achieved in a simple and efficient manner and at the same time. For example, a reflective transmission of the projection beam from the projection device into the eye of a user when the hologram set is designed to be essentially reflective in an angle gain-neutral manner.

Ideally, the imaging device comprises three optical hologram sets, two of the three optical hologram sets are predominantly transmitting, one of the two predominantly transmitting optical hologram sets is angle-amplifying and a third optical hologram set is predominantly reflecting. This makes it easy and efficient to achieve optical angle amplification and at the same time a reflective transmission of the projection beams from the projection device into the eye of a user.

Advantageously, the three optical hologram sets are arranged sequentially one behind the other, essentially in the user's line of vision, with the optical hologram set with its angle-enhancing design being arranged between the other two optical hologram sets. One of the advantages achieved is that the angle-enhancing hologram set can be formed homogeneously over its lateral extension, which is particularly advantageous for thick holograms with a lateral thickness, e.g. >100 µm.

Ideally, a minimum of two holograms in at least one angle-enhancing optical hologram set are arranged at least partially inside each other. This allows the two holograms to be arranged in a space-saving manner.

Conveniently, at least one of the optical hologram sets comprises a plurality of holograms which, in a lateral direction is substantially perpendicular to a user's viewing direction in the plane in which an imaginary line of communication lies between the user's two eyes and a user's straight line of vision, are arranged segmentally adjacent and/or continuously extending in a lateral direction. This allows a lateral position-dependent deflection of the incident light beams to be provided so that the subsequent angle-enhancing hologram set receives beam angles independent of the lateral position. Nevertheless, the definition of "hologram set" is retained, since the transition from finely distributed hologram segments/pieces/parts to a continuous process is smooth. In the case of a continuous extension, a simpler implementation is made possible because, for example, mechanical steppers are not required.

Advantageously, at least one angle-enhancing optical hologram set is homogeneous in at least one lateral direction. This allows, among other things, a simple production.

Ideally, a minimum of one optical hologram set, preferably at least partially reflective optical hologram set, comprises one or more holograms which are formed segmentally as planar or curved reflective phase surfaces.

The planar and/or curved reflective phase surface makes it easy to achieve phase-selective reflection in the direction of the eye.

Ideally, the eye detection device comprises a Hartmann-Shak sensor and/or an interferometry device for detection.

The interferometry device is designed for emitting the detection of at least one reference beam, in particular wherein several reference beams can be generated by mutually coherent light sources. The advantage of a Hartmann Shak sensor is that it is particularly simple in design and therefore cost-effective to manufacture.

An interferometry device has the advantage of higher flexibility because, in contrast to the microlenses of a Hartmann-Shak sensor arranged at a fixed distance, a higher spatial resolution is possible or can be adapted accordingly. Advantageously, the light wavelength of the irradiated light can be used with the identical light path (projector imaging eye).

Optionally, a separate wavelength in the near infrared is also possible, whereby at least one further volume hologram set is then arranged in the imaging device.

The projection device is designed to transmit image information by means of at least two, preferably three different wavelengths, wherein at least one optical hologram set is arranged per different wavelength, which is preferably arranged at least partially one inside the other. If the projection device can project light using at least three different wavelengths, a three-dimensional, colored image in the colors red green blue—RGB—and thus a realistic three-dimensional image is possible.

Advantageously, at least one angle-enhancing optical hologram is arranged per lateral direction. This allows not only a deflection of the wavefront/beam towards the eye along a lateral dimension, but also a second lateral direction: not only is the direction of view left/right, because the eyes are moved there particularly often, but also the other lateral direction of view up/down is supported. Therefore, the latter is usually at least partially compensated by a corresponding movement of the head. Analogous to the additional parameter "Color", this additional parameter "two-lateral direction" can be converted by connecting the corresponding hologram sets in series and/or one after the other.

Advantageously, the eye detection device comprises one or more first cameras for detecting and/or monitoring the position and/or direction of the eyes of one or more users. Hereby, allowing the position and/or direction of the eyes to be detected flexibly and reliably.

Alternatively, for example, the rough position of the respective users or their eyes can be determined using one or more first cameras and then the corresponding direction of the respective eyes can be determined using a further method, for example by using interferometry. The advantage of a camera is, among other things, that the fact that the iris diaphragm dims the beams reflected by the eye symmetrically to the optical center of the eye can be exploited. The determination of the eye direction or position is therefore carried out here via a light part scattered back from the retina, for example, from a light beam bundle previously irradiated for the three-dimensional information.

The almost identical light reflection is advantageously exploited when the eye looks in the direction of propagation of the light beam. A combination with a Hartmann-Shak sensor and/or an interferometry device increases the accuracy of the detection.

The advantage of the optical system is that it is designed as spectacles, with the imaging device arranged in at least one lens of the spectacles, making it easy to provide each user with a small and mobile optical system that can be flexibly adapted to the respective user.

Advantageously, the optical system comprises at least one, in particular, two second cameras to capture an environmental image. This makes it possible, for example, to take additional pictures of the surroundings, so that enlarged pictures of the surroundings can be displayed to a user. This allows further fields of application.

A processing device for processing images of at least one-second camera is conveniently arranged or can be connected to the optical system, in particular wherein the processing device is designed for photogrammetric evaluation of the recorded environmental images. By means of photogrammetric evaluation, for example, when the user passes an object or the like and watches it with one or more surrounding cameras of glasses, continuous images can be taken from different angles.

The processing equipment then processes the corresponding images photogrammetrically and can then calculate a realistic three-dimensional image using known methods.

The advantage of the optical system is that it includes a projector that is designed to generate an exposure pattern, especially a static one. In the optical system, the projector can be integrated as glasses in a bracket between the two lenses. By means of an exposure pattern which can be provided by the projector and which can be changed statically or else dynamically, an exposure pattern can be thrown onto a real scene. If at least one camera then picks up the exposure pattern on objects in the surroundings, the surfaces of the objects can be evaluated better than the surface textures recorded by the homogeneous ambient light alone.

If a user of the optical system now moves past an object, the accuracy of the captured object, scene or the like is further increased.

Using known methods, such as evaluation methods known as "Structure from Motion (SFM)", a realistic three-dimensional image can then be calculated. Particularly advantageous for this are nearby objects, which can then be captured with high resolution.

The projector is designed to provide an exposure pattern with one or more wavelengths in the near-infrared range. The near infrared range includes in particular wavelengths between 780 nm and 3 μm. A wavelength of 850 nm is preferred. This avoids disturbing effects in the visible area due to the projection of the pattern.

Advantageously, the processing device cooperates with the projection device and imaging device in such a way that the evaluated environmental images can be at least partially overlaid with the surrounding area visible through the transparent area of the imaging device in accordance with the viewing direction of a user.

This allows you to define or determine a computer-generated coordinate origin for an object or group of objects. This increases the flexibility of the optical system with regard to possible subsequent applications.

Advantageously, the optical system, in particular, the imaging device, comprises a dimmer which is designed in such a way that the degree of transparency of the imaging device can be adjusted, preferably lowered. This allows the ambient background seen through the transparent area of the imaging device to be at least partially attenuated, which improves the perception of the image information projected by the projection device by one or more users.

It is advisable to use the dimmer and/or the processing device together with the projection device to create a visible background of a real scene or environment with at least partially more homogeneous colors. This makes it possible, for example, to design the white or monochrome background in relation to the person and thus enables a slightly tinted white or monochrome screen for the projection of a two or three-dimensional image. The actual image is then projected as an overlay onto this white or monochrome screen, which is at least partially or slightly tinted, making it easier for one or more users to see the image in daylight.

It makes sense to provide the image information in the form of marking information for an object or the like, so that an object viewed by means of the optical system can be identified from the images by means of the processing device and the marking information can be virtually depicted on the object as an overlay for one or more users accordingly.

This makes it easy, for example, to project instructions for assembling a cabinet onto the respective cabinet parts. Marking information can generally include any information: For example, it can be displayed in the form of non-verbal symbols such as arrows, etc. or as corresponding text.

In this case, the object is then recorded by means of the cameras for the surrounding images, the processing device recognizes the respective object by comparing it with corresponding information in the operating instructions and then projects corresponding marking information for a user onto the respective object.

In general, for example, three-dimensional information can be brought into the correct three-dimensional position from outside, e.g. building instructions with arrows through the processing equipment and displayed accordingly. For example, with a 3D scanner coming from an external source, these data can be brought directly to the optical superimposition with the actually visible scene/environment (Augmented Reality) by means of the positions determined from the surrounding cameras. Together with the images of the second camera(s) for the environment, the three-dimensional information obtained is thus also available for further applications or calculations.

Advantageously, the number of coherent light waves for generating a virtual optical point is odd, preferably at least 7, especially at least 11, especially preferably at least 13, especially 13. Using at least 7 light waves, a virtual wavefront without sideband can be generated from point light sources, so that a two- or three-dimensional image can be generated with sufficient accuracy or resolution.

Other important features and advantages of the invention result from the subclaims, from the drawings, and from the corresponding figure description based on the drawings.

It is understood that the features mentioned above and those to be explained below can be used not only in the combination indicated but also in other combinations or in a unique position, without leaving the scope of this invention.

Preferred designs and designs of the invention are shown in the drawings and are explained in more detail in the following description, whereby identical reference symbols refer to identical or similar or functionally identical components or elements.

Figure 2:
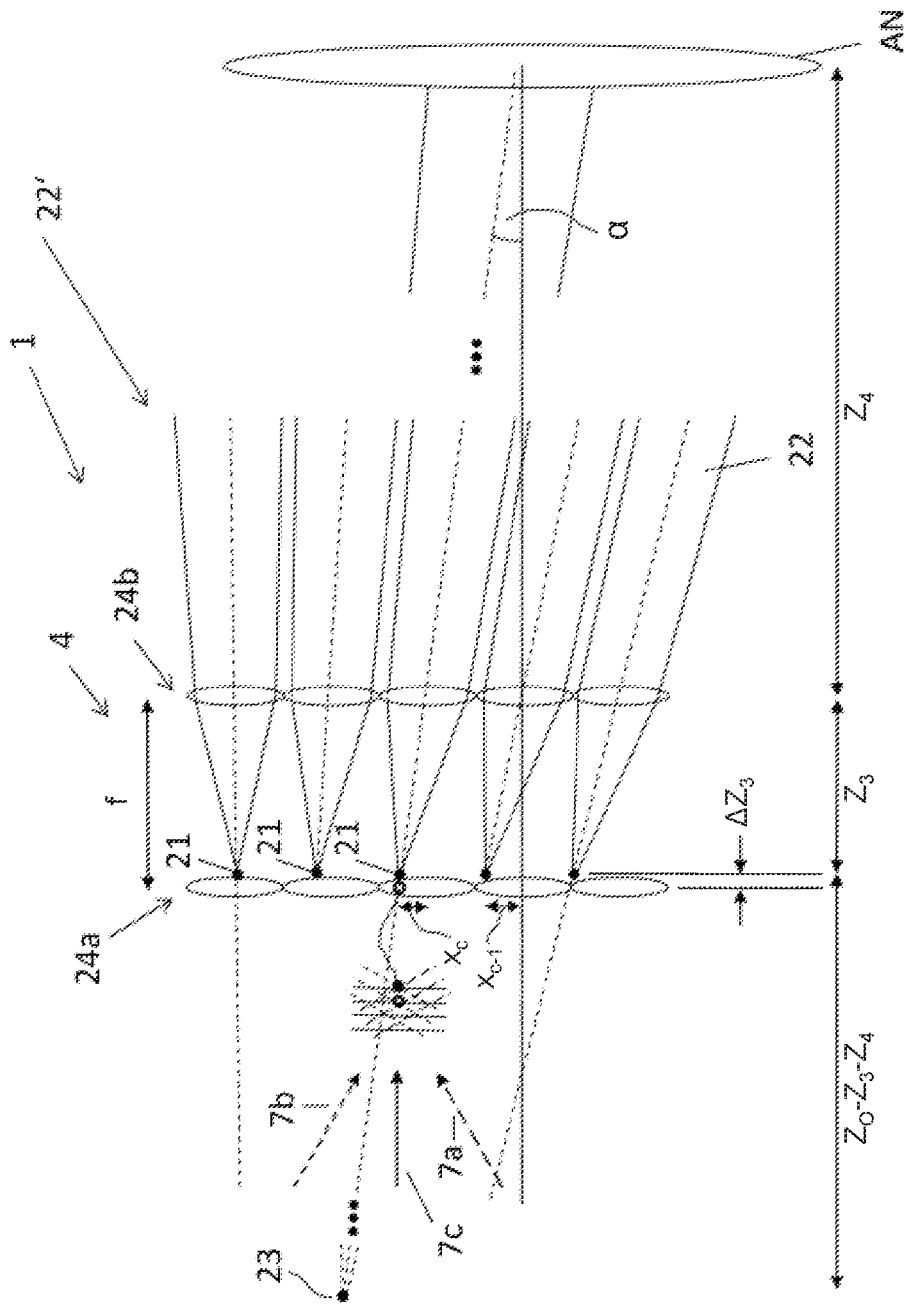

FIG. 1 An auxiliary arrangement to illustrate an embodiment of the present invention is shown;

FIG. 2 Another auxiliary arrangement for explaining an embodiment of the present invention;

FIG. 3 Another auxiliary arrangement for explaining an embodiment of the present invention;

FIG. 4 Another auxiliary arrangement for explaining an embodiment of the present invention;

FIG. 5 Parts of an optical system according to an embodiment of the present invention in a schematic form;

FIG. 6 Parts of an optical system according to another embodiment of the present invention in a schematic form;

FIG. 7 Parts of an optical system according to another embodiment of the present invention in a schematic form;

FIG. 8 Parts of an optical system according to another embodiment of the present invention in a schematic form;

FIG. 9 Parts of an optical system according to an embodiment of the present invention in a schematic form; and FIG. 10 Different perceptual areas of an eye.

In the following, the auxiliary arrangements and design forms of the invention are explained using beam paths, etc. Along with a horizontal axis (left/right), which runs in the following figures in the drawing plane.

Of course, the actual structure is three-dimensional, i.e., the auxiliary arrangements and design forms also have a vertical axis, i.e., an axis perpendicular to the drawing plane, which can then essentially correspond along the vertical axis to the structure along the horizontal axis.

In addition, unless otherwise stated, the following figures refer to only one wavelength, so that, unless otherwise described, the following figures refer to only one lateral direction and only one wavelength at a time.

FIG. 1 shows an auxiliary arrangement to illustrate an embodiment of the present invention.

FIG. 1 shows an auxiliary arrangement to explain the projection of an imaginary object point in infinity over coherent virtual light sources, which generate a collimated illumination beam, i.e., when the eye is focused to infinity, at an angle α.

For reasons of clarity, no reflection with quasi-identical return paths is shown in FIG. 1, as are the projection paths along an optical axis terminated by the cornea/eye lens, whereby the retina is also not shown.

First, a situation is assumed in which the object point hit the eye at infinite distance (in relation to the focal length of the eye this concerns distances over 4 meters) with (almost) parallel rays. To generate these (almost) parallel rays in front of the eye, a virtual light source 21 within each microlens of a first microlens array 24a is assumed. The respective virtual point light source 21 is preferably arranged in the plane of the respective field lens of the first microlens array 24a. Since these deflect the light of the virtual point light source 21 depending on its position, but otherwise have hardly any influence on the beam shape, this is also called field lens (field).

After divergence on the subsequent microlens of the second microlens array. 'MLA' 24b, it transforms the beam into a (near) collimated beam. Since the total beam consists of many partial beams, this is also referred to as "beamlets" 22.

Both MLAs 24a, 24b can, therefore, have identical focal lengths $f=f_{field}=fsL$ and also have exactly this distance $Z_3$ from each other. These two microlens arrays 24a, 24b can be part of an imaging device, which is arranged in an eyeglass or projection glass.

To estimate the angular deflection α on the retina, the following relation between the deflection from the respective center x and the focal length of the field lens $f_{field}$ can be used:

$$\alpha \approx \tan(\alpha) = \frac{x}{f_{field}} \qquad \text{Eq. 1}$$

For small angles (<5°), the tangent function of an angle approximates the angle itself. For a focal length of $f_{field}=0.5$ mm, an angle of α=+/−50 mrad (~6°) is generated at a lateral displacement of the virtual point/light source 21 of x=+/−25 μm, which corresponds to the viewing range at full resolution. The diameter dfield of such a microlens can be several 100 µm. $d_{field}=d_{BL}$ is particularly preferred. The following effect can, therefore, be achieved with microlenses: the smaller the focal length fsL, the larger the deflection angle α.

The pupil of the eye AN is larger than the diameter of a microlens, therefore several beamlets 22 of a microlens array (in this case collimated) must be combined to a total collimated beam 22' with a diameter of the selected pupil aperture.

A corresponding number of these virtual light sources 21 must, therefore, be generated, but they all have the same relative distance x (depending on the angle) from the respective microlens center when the object point lies in infinity.

FIG. 2 shows another auxiliary arrangement for explaining an embodiment of the present invention.

FIG. 2 shows an auxiliary arrangement for detecting the projection of an imaginary object point 23 in the vicinity of the distance $z_o$ from the eye.

Internally coherent virtual light sources 21 generate a slightly divergent total 22' illumination beam at an angle α. Due to the proximity of the object point 23, the eye focuses on it.

In the event that the object point 23 is not infinite, but much closer than, for example, the above-mentioned 4 m (hyperfocal) distance, the eye is illuminated with diverging beams/beamlets 22, as shown in FIG. 2. In this case, the virtual light sources 21 are shifted with increasing lateral distance to $X_{c,n}=X_c+n*\Delta x_n$ from the respective microlens center and their position must change in the z-direction by $\Delta z_3$ Thus, for small distances, or focal length fsL<<($z_o-z_4$) results in lateral distance change per microlens n:

$$\Delta x_n = n \cdot \frac{f_{BL} \cdot d_{BL}}{Z_0 - Z_4 - f_{BL}} \qquad \text{Eq. 2}$$

For the displacement of the position of the virtual light sources 21 by a small distance in z-direction applies:

$$\Delta Z_3 = \frac{f_{BL}^2}{Z_0 - Z_4 + f_{BL}} \approx \frac{f_{BL}^2}{Z_0} \qquad \text{Eq. 3}$$

For object distances $z_o >> z_4$, $f_{BL}$, the simplification can be performed on the right side of the Eq (3) with sufficiently high accuracy. Thus, with a distance of $Z_0=100$ mm and the already mentioned focal length $f_{BL}=0.5$ mm, the relative distance is $\Delta Z_3=2.5$ µm.

Not too large distances $\Delta Z_3$ can be achieved by relative phase shifts, which is described in the next section, plus the generation of virtual light sources 21.

Virtual light sources 21 are generated by superimposing coherent light waves with limited lateral extent.

This is indicated in FIGS. 1 and 2 at the position of 3 overlapping wavefronts 7a, 7b, 7c, which, for example, only have a width of a few 10 µm in the lateral direction (along with their wavefronts). The more such wavefronts 7a, 7b, 7c are used, the more focused point 21 is with negligibly low sidebands.

The minimum angle of the wavefront 7a, 7b relative to the wavefront 7c exactly perpendicular to the optical axis is denoted by Δϕ. Altogether 2*m+1 irradiated wavefronts 7a, 7b, 7c with different angles of the wavefronts 7a, 7b, 7c each form a virtual point/light source 21. 2*m+1 can be between 5 and 21, i.e., m between 2 and 10. The angles increase linearly with integral multiples m to both sides of the optical axis. If the phase of the wave 7c along the optical axis (wavefront perpendicular to it) is assumed to be zero, then Δδ applies for the necessary phase shifts as a function of the desired relative position $\Delta Z_3$:

$$\Delta\delta = 2\pi \cdot \frac{\Delta z_3}{\lambda} \sqrt{(l + (m\Delta\phi)^2)} \qquad \text{Eq. 4}$$

In Eq. 4, the wavelength λ of the light used is also entered directly. The phase shifts Δδ for the case of the object point in infinity are identical to zero according to Eq. 4, since $\Delta Z_3=0$, i.e., the virtual points/light sources 21 all lie directly in the main plane of the micro/field lens array 24a, which is shown in FIG. 1.

In order to combine the individual beamlets 22 into a complete beam 22' "without spaces", the microlenses of the microlens array 24b must be illuminated at full aperture in the input side. The respective virtual light point/light source 21 must be small enough in lateral extent, which in turn is achieved by laterally limited beams of wavefronts with comparatively high angles of incidence m*Δϕ. Roughly, the condition must apply to the largest angle.

$$m \cdot \Delta\phi \approx \frac{d_m}{2 \cdot f_{BL}} \qquad \text{Eq. 5}$$

For example, assuming a focal length $f_{BL}=0.5$ mm and a diameter of $d_{BL}=0.4$ mm, a maximum angle to m·Δϕ=+/−400 mrad is obtained. If edge effects are excluded, then, for example, +/−200 mrad is a sufficient angular range. A focal length in the range 0.3-1 mm and a diameter in the range 0.2-0.5 mm are particularly preferred.

With a beam shape with Gaussian profile—which can be advantageous—the beam must have an even larger maximum angle, but the beam amplitude decreases with increasing angle. One value can be advantageous, i.e., a total of 13 beam angles to $$m >= +/-6$$

create a virtual point 21 with almost no sideband. Under certain conditions—for example when interference phenomena can be exploited—the number m can also be reduced to m=+1-3, i.e., 7 beam angles.

However, for the maximum angle of incidence of about +/−200 mrad given above, a fairly large input aperture would have to be maintained, which would be about 9 mm if the distance of a projector, for example, a micro- or pico-projector, were 20 mm, which would not be compatible with a compact design, e.g., in a spectacle frame.

The following in FIG. 3 describes how this is achieved in the sense of a miniaturization of projection device 2.

FIG. 3 shows another auxiliary arrangement for explaining an embodiment of the present invention.

FIG. 3 shows a detailed view to illustrate the angular conversion or angular gain of a small and compact projection device for a large angular spectrum in front of the microlens array 24a, 24b.

The dashed projection device 2 would result if no volume hologram 5b were used for selective angular conversion. The Bragg planes are indicated in FIG. 3 only by way of example with respect to the central ray (angle n=0); at 2m+1 Bragg planes they are "superimposed".

FIG. 3 shows how the required high angle of incidence can nevertheless be achieved at the location of the field lens by means of a small angular spectrum—i.e., small dimensions, in particular aperture 12, in the projection system 2.

For the sake of clarity only m=+/−1—and the beam with angle O—shown (2*m+1=3).

FIG. 3 shows that here three light beams with a respective angle with a small irradiation area can be converted into three light beams with a respective angle with a large beam area (or irradiation area at the location of the field lens) using a volume hologram set 5b. Since several volume holograms can be integrated side by side and/or into one another and the Bragg condition is selectively "adjustable" for each beam angle, a small angular range can be converted into a large one. Thus, this element 5b has an optical angle-enhancing effect.

Together, planes with a refractive index stroke (positive or negative nature) lie at an angle in the material with respect to the carrier material such that these planes represent a kind of "mirror" for the incident beam under the so-called Bragg angle and then deflect this beam accordingly. Since these planes can be written into the carrier material at almost any angle in depth direction next to each other and/or integrated into each other, beams with completely different angles of incidence can be converted into completely different output angles, both in transmission and in reflection.

The one-dimensional volume hologram sets can be sized so that the individual volume holograms only fulfill one (lateral) dimension of the Bragg condition, while the other is hardly affected. For volume holograms, a complete two-dimensional element or volume hologram set can be realized by connecting both lateral dimensions (e.g., x and y) in series and/or in one another.

To create a color image, however, at least 3 wavelengths, e.g., red, green, blue, RGB, are used to obtain a realistic impression. Both active and passive optoelectronic elements for projection device 2 can be designed to transmit or receive multiple wavelengths. Even with volume hologram sets, several holograms for different wavelengths, in particular, one for each wavelength, can be integrated side by side and/or into one another.

The angular selectivity of a volume holographic grating is estimated in order to estimate the reduction of the irradiated angular range for the generation of a virtual point/light source 21. Among other things, this is a function of the thickness of the volume grating and can be several 100 μm depending on the refractive index modulation. In this case, for example, 1-5 mrad acceptance angles are possible. Assuming an acceptance angle of 3 mrad, at m=+1-6 (as-sumed minimum number of required beams symmetrically around a center beam m=0) about +/−18 mrad is necessary. This reduces the space required essentially perpendicular to the straight line of vision of a user for a projection/detection unit 2, 3 to just under 1 mm (at 20 mm projection distance), which would comfortably fit into a frame.

The projection part of PD unit 2, 3 preferably consists of a pixel-based amplitude/phase modulator, which has pixel sizes in the μm range in particular. Pixel sizes in the μm range. Alternatively, pure phase modulators can also be used if adjacent or conjugated phase values generate a "synthetic" amplitude value. Such phase modulators are also known as "spatial light modulators".

FIG. 4 shows a further auxiliary arrangement for explaining an embodiment of the present invention.

FIG. 4 shows an auxiliary arrangement for describing and achieving the visual field around the maximum angle $\beta_i$ in the transmission arrangement. with the volume hologram set 5d and the volume hologram set 5c' (for the sake of clarity, the volume hologram set is otherwise marked with reference sign 5c here in transmission and therefore marked with reference sign 5c', not shown in reflection), which increases the angle per microlens by ΔY' and Δβ, i.e., increasing the index i+1. The volume hologram set 5d is designed to allow an angle-selective increase of the angular range at the location of the field lens dependent on the lateral position. As in the previous figures, only the central beam (solid line) is shown in FIG. 4 for clarity. The dashed line describes the situation in which an angle α is generated by the parallel displacements of the beam bundles through the respective field lens of the first microlens array 24a. Also for the sake of clarity, the maximum angle of rotation of the eye is indicated with $\beta_i$, around the center of the lens and not around the center of the eye. For reasons of clarity, the lower mirror-symmetric microlens and hologram arrangement has also been omitted.

The field lenses or microlenses within the microlens array 24a deflect the beams at a certain angle when the virtual light point/light source 21 irradiates outside the respective lens center. It is initially assumed that the angle of incidence in front of the field lens/microlens is parallel to the optical axis. To be able to estimate the angular range, let us assume, for example, that the focal length of each microlens is $f_{BL}=f_{field}=0.5$ mm and the diameter of each lens is $d_{BL}=d_{field}=0.4$ mm.

With the eye stationary, the angular range that could be covered solely by the field lens/microlens including edge effects would be about +/−200 mrad—or about 25°—which would correspond to an image field of 800 mm at a distance of 2 meters.

A full three-dimensional impression, however, only arises when a) about 120° viewing angle can be covered, and
b) the visual field is maintained at full resolution (~6°) when the eye rotates.

FIG. 4 shows how the volume hologram set 5c' can increase the viewing angle range next to the field lens/microlens so that the above requirements a) and b) can be fulfilled.

$$\beta_1 - \beta = \Delta\beta = \frac{d_{BL}}{z_4} \qquad \text{Eq. 6}$$

According to Eq. 6, the differential angle Δβ=20 mrad at an assumed microlens diameter of $d_{BL}$=0.4 mm and a distance imaging device 4 to eye AN of about $z_4$=20 mm when in the region near the optical axis. The value decreases with longer distances. For example, to provide a beam diameter of about 3.5 mm (2 mm because of the optimal pupil diameter and assuming a reserve), preferably about 2*4+1 microlenses are used, which provides about $\beta_1-\beta_{i-5}$=4*20=+80 mrad (Index 0-4). With a maximum angular range of +/−200 mrad assumed above, this is possible by a high-resolution field of view of +/−3° (=+/−50 mrad), and
a correction for the full field of view of max.+/−80 mrad, and
allowing a reserve of +/−70 mrad.

With the above angular range and the alignment of the laterally segmented holograms within the 5c' volume hologram set to the eye AN, the field of view is limited by the size of the imaging device in the lens. For lens sizes of 50 mm in the lateral direction or more in, e.g., the horizontal direction, the desired maximum viewing angle of 120° can be achieved, i.e., the eye can rotate by the β angle of +/−60'.

A lower limit of about +/−200 mrad is preferred, which at a focal length $f_{BL}$=0.5 mm corresponds to a microlens diameter of $d_{SL}$=0.2 mm. Conversely, with a slightly larger microlens diameter, the focal length could be slightly larger.

For the use of a projection screen/glass, the degree of freedom is greater since the size (in this case limited to the width) is essentially not limited. First, the size of the surface/glass must be determined from the distance of the group of persons and the maximum viewing angle (assumption+/−60° as described above).

For one person this would be at a distance of 2 meters, full 7 meters for the glass. With 3 to 4 assumed persons on a space of lateral 1 meter, the width of the surface/the glass increases for example to 8 meters.

In order to be able to use the full field of view, the full resolution is not available in the case of designs of the present invention. It is known that in the edge region (>+/−3°) of the eye, perception is possible only with significantly reduced resolution (about ⅕) ("still recognized in the corner of the eye"). In this case, it is not necessary to illuminate the full pupil with a diameter of 2 mm (defined by 5-10 microlenses) for a total beam 22, but a diameter about 5 times smaller, i.e., about 400 μm, is sufficient. According to the above estimates, only 1-2 microlenses have to contribute to the peripheral field—defined by the full field of view minus the field of view at full resolution.

FIG. 4 shows an idealized arrangement in transmission. Coming from the left around an optical axis, the central beams with angles $γ_{i'}$ are first rotated by the laterally segmented volume hologram set 5d into an angle quasi-parallel to the optical axis. Another task of this first volume hologram set 5d is the angular-selective conversion of the 2*m+1 beams (around the central beam) into larger angles around a small virtual spot 21 in the plane of the field lens (see above).

Since this angular conversion takes place with a small acceptance angle, this first volume hologram set 5d is rather "thick" (100 μm to 3 mm) compared to the second volume hologram set 5c' with thicknesses between a few 10 μm to 30 μm.

Through the lateral position relative to the respective optical axis of the respective microlens of the first microlens array 24a, the beam is directed at an angle a (at infinitely distant point) to the respective microlens of the second microlens array 24b to form a beamlet 22 having a diameter of about that of the respective microlens 24a of the first microlens array 24a.

This beam 22 propagates together with the parallel neighboring beams in a beam 22 towards the volume hologram set 5c', is converted thereby the angle $β_{i'}$ and then propagates towards the lens/cornea of the eye. Depending on the rotation of the eye AN, different groups of the microlens array 24a, 24b can be optically controlled for a certain beam direction.

Only the preferred applications of this invention are described below: glasses and projection glass.

FIG. 5 shows in schematic form parts of an optical system according to a design form of the present invention.

FIG. 5 shows an optical system comprising three volume hologram sets 5a, 5b, 5c. The volume hologram sets 5a, 5b, 5c, in contrast to the following figures, in which they are combined in a volume hologram set, are individually executed and displayed. The microlens array 24, with which wave fields are (ideally) parabolically curvilable, can generally be omitted if the virtual point is replaced by a number of virtual points defining an extended wave field. This is done by suitable amplitude and phase control of the microprojector 2. These volume hologram sets 5a, 5b, 5c are arranged sequentially one behind the other, with the first volume hologram set 5a being angle amplification-neutral, i.e., not angle-amplifying, and transmitting.

The second volume hologram set 5b is angle-amplifying and transmitting while the third volume hologram set 5c is reflective and angle amplification is neutral.

Further in FIG. 5, the non-angle-enhancing hologram sets 5a, 5c show lateral segments 26, which essentially represent individual holograms and are lined up laterally. These single holograms of hologram set 5a, 5c allow an angular deflection dependent on the lateral position for all light beams irradiating at this position.

The angle-enhancing hologram set 5b, arranged between the two non-angle-enhancing hologram sets 5a, 5c has several volume holograms, preferably in the number 7 or 13, which are essentially "multiplexed" into one another, i.e., arranged one within the other or superimposed. Angles of the central incidence and failure beams are independent of the lateral position by the angle of rotation γ. This volume hologram set 5b is particularly easy to produce.

The angle-enhancing hologram set 5b is thicker in the axial direction, i.e., perpendicular to lateral expansion, than any of the other two volume hologram, sets 5a, 5c.

In FIG. 5 the volume hologram sets 5a, 5b, 5c are only shown schematically. If they are used in the lens of a pair of glasses, for example, they must be adapted to the existing curvature.

FIG. 6 shows schematic parts of an optical system according to another version of the present invention.

The above versions of FIG. 5 are based on the free jet arrangement. Alternatively, they can also be arranged via "optical waveguides", as shown in FIG. 6 as an example. At the edge of the optical waveguide 8, which in the simplest case is a spectacle with planar surfaces (i.e., without refractive power), light is emitted in a certain angular range via a PD equipment/projection/detection unit 2, 3. At angles of incidence of approximately >45°—slightly dependent on the type of glass—light is totally reflected at the interfaces, i.e., as with mirrors, so that longer distances can be covered within the glass pane 4. Light at certain lateral positions can be decoupled using Volume Hologram Set 5c. The condition of total reflection does not apply here.

If the light in FIG. 6 of projection unit 2 is radiated at a certain angle, the Bragg condition is reached in the first angle-dependent converters in the volume hologram set 5, comprising an angle-enhancing volume hologram set 5d and a reflective volume hologram set 5c, the imaginary common boundary of which is indicated by the straight dotted line within the volume hologram set 5. In FIG. 7, the two-volume hologram sets 5d 5c are then designed separately and spaced apart from each other. The virtual point light source 21 is then generated within the volume hologram set 5d, which, after reflection by the volume hologram set 5c with its laterally arranged segmental reflection elements 15 in the form of a microlens array (analogous to 24b and 5c' in FIG. 4) is directed towards the eye AN. If the region of the Bragg condition is left, i.e., the angle becomes larger, for example, further reflection elements are addressed and the eye AN is hit by a larger combined beam (which is necessary for the high resolution).

From a certain angle (e.g., greater than 75°, the theoretical upper limit is at 90°) it will be difficult to meet the Bragg condition for the transmission hologram set 5d.

Since the optical waveguide 8 should preferably not be wider than, e.g., 3 mm, multiple reflections must be permitted in order to bridge a certain lateral distance. The Bragg conditions of the individual volume hologram set 5d, 5c are set such that, for example, the lower (invisible lateral) segments of the volume hologram set 5d in FIG. 6 do not fulfill these and let the light through undisturbed. The light can then reflect one or more times within the hologram set 5 before one of the upper segments of the hologram set 5d fulfills this condition and deflect the light at an angle so that the Bragg condition is also fulfilled for the reflection elements 15 in the hologram set 5c. If this is fulfilled, the light is reflected towards the eye since the reflecting elements 15, which typically have to tolerate a larger angular spectrum, are preferably designed as "thin", in particular laterally segmented volume hologram set 5c.

It may be necessary to rotate the polarization here by means of the first thicker hologram set 5d single-beam-angle-selectively in order to achieve an optimum decoupling between desired transmission and desired passage for multiple reflection.

Projected light, which is ultimately perceived by the retina via PD devices 2, 3, is reflected back through the pupil in the same direction towards imaging device 4. There, the same beam direction components take the same path back in the direction of the PD device 2, 3. This contains a semipermeable mirror at its exit aperture, which directs the light onto a separate detection unit/device 3. A projection/detection unit (PD) therefore comprises a projection device 2 and a detection device 3.

FIG. 7 shows in schematic form parts of an optical system of a further design form of the present invention.

In FIG. 7 an arrangement of a projection/detection device 2, 3 is shown in order to project light in the case of three different eye positions and eye position states—angles—both laterally and at an angle rotated on the one hand onto the retina and on the other hand to capture light reflected therefrom. This reflected light is recorded on a two-dimensional area detector with respect to position and angular selectivity.

The selection can be carried out interferometrically, for example, via the reference laser beams 18 drawn. The laser beams 18 from the mutually coherent light sources 25, which illuminate the projection and detector surface, have a fixed phase relationship for the interferometric detection approach. Three colors can cover the color spectrum, for example red, green, blue.

FIG. 7 shows a simplification in that several functions is integrated into only one volume hologram set 5d:

The angle-selective increase of individual beams to generate a virtual point/light source 21 with high beam divergence.

Change in direction of the beam depending on the lateral position in the direction of reflection elements (analogous to the function of the microlens array 24a). This is achieved by skillful/suitable superposition of wavefronts 7a, 7b, 7c from projection device 2, caused by a position-dependent control of amplitudes and phase values on projection device 2. Afterward, the respective virtual point/light source 21 can also have a slightly different spatial shape than a point—for example, a laterally extended wavefront.

Essentially, the imaging device 4 in this particularly preferred design consists of only 2 elements:

a volume hologram set 5d (preferably in a thick version with thicknesses between 0.5 and 2 mm), which has the following tasks:

1. Lateral conversion of the direction of light propagation in segments without angle amplification, i.e., neutral angle amplification
2. Position-independent angle reinforcement and
3a. Provision of the tasks of a field lens (analog to the microlens array 24a in FIGS. 1-4) in such a way that the direction of propagation of light of a virtual point is periodically varied segment by segment to the reflection elements 15 of the volume hologram set 5c as a function of the lateral position.
3b. The reflection elements can be parabolically curved or many virtual points can be combined to a first wavefront in such a way that the field lens function (analog to microlens array 24a in FIGS. 1-4) is no longer required. The light can then be transmitted directly to, in particular parabolic, curved reflection elements 15 in the volume hologram set 5c or
3c. combining many virtual points into a second wavefront in such a way that the field lens function (analogous to microlens array 24a in FIGS. 1-4) is no longer required and the light can then be transmitted directly to the planar reflection elements 15 in the volume hologram set 5c.

The volume hologram set 5d does not "work" in the direction of reflection, as the Bragg conditions are not fulfilled. For these thick holograms in the volume hologram set 5d, deviations from some mrad may already be sufficient. In contrast, the reflection elements 15 in the form of holograms in the volume hologram set 5c are preferably thin (thickness preferably between 10-30 µm), as a higher angular acceptance is necessary to direct light selectively towards the eye. Light from the environment is transmitted unfiltered by both volume hologram sets 5d, 5c.

FIG. 7 further shows a simplified beam path 10, 11 from the projection device 2 in the direction of the retina—10—and back from the retina—11—to the projection/detection device (PD) 2, 3. In a rough approximation, the light takes the identical path 10, 11 in both directions. However, the light from the retina is not reflected like a mirror but rather scattered. By means of the mutually coherent light sources 25 and in cooperation with a phase modulator 13, which has a lens 14 on the output side, the image information is projected onto the imaging device 4 by the projection device 2. A beam splitter 9 is arranged in the projection and detection beam path 10, 11 to direct the light to be detected onto the detection device 3.

Due to the anatomy of the eye, the following optical rules must be observed for the subsequent detection, especially for the reflection from the retina of the eye AN:

The light is primarily reflected from the irradiating direction, whereby the intensity is greatest when the plumb of the cornea/lens coincides with the irradiation direction ("cat's eye").

The reflected light appears primarily red, as the bloodstreams absorb other color components more strongly.

The above designs can be used for the detection of the eye AN with respect to its lateral position and/or angular rotation by determining the beam spot recorded on the detection surface with respect to position and angle in order to be able to conclude on the 2 eye positions shown in FIG. 7 (different lens positions) and the 2 eye condition positions (eye rotation angle). If, for simplification, it is assumed that the eye AN is on the central axis of the hologram set (5d, 5c) and the optical system 1 does not leave this position, for example in the form of glasses, then the angular information allows conclusions to be drawn about the rotation of the eye. However, since the glasses will never be positioned exactly laterally or the image field is larger than a reflection element 15 (e.g., 400 μm diameter), it is advantageous to measure additional lateral information.

To measure the angle of rotation of the lens, i.e., of the eye AN, the following methods or sensors can be used alternatively or in addition to images from a first camera and the detection of the optical boundary by the iris diaphragm:

interferometry with reference beams (see FIG. 7)
Hartmann-Shak sensor, e.g., with an integrated microlens array FIG. 8 shows, in a schematic form, parts of an optical system according to another version of the present invention.

FIG. 8 shows a simplified optical system 1 in the form of spectacles.

A PD unit 2, 3 is integrated into each frame, which projects the beams onto the respective lens 4. This reflects the transformed radiation back to the corresponding eye AN. Each eye AN is irradiated or detected by a projection/detection device 2, 3. The lenses 4 comprise volume hologram sets—as described in FIG. 5-7—and if necessary a correspondingly curved surface is connected in front of them in order to achieve the full passive vision-enhancing effect. Furthermore, processing equipment 19, a corresponding power supply such as batteries, rechargeable batteries, etc. or the like can also be arranged on or connected to spectacles 1.

In addition, the glasses may include:

External mini-camera(s) 17b (e.g. on the front joint of the frame near the lenses). This could be used, for example, to detect the content of a paper page and return it to the eye in the enlarged form via 3D or 2D projection. This can be advantageous if the glasses are sufficient for simple everyday tasks, but additional spectacles are not desired, Microphones, e.g. in the vicinity of the mini cameras to achieve a directional effect. Together with an inconspicuous coupling of the amplified sound into the ear of a usually elderly person, this would be a very effective hearing aid.

Inconspicuous sound coupling into the ear together with a 3D visualization of a concert or stage performance would amplify the entire acoustic impression.

The glasses may also include a projector 6 designed to generate an exposure pattern. For example, the projector 6 can be integrated into a bracket between the two lenses. Using an exposure pattern provided by the projector 6, which can be changed statically or dynamically, an exposure pattern can be thrown onto a real scene.

If the at least one camera then records the exposure pattern on objects in the surroundings, it can be better evaluated than a surface texture recorded by daylight alone. If a user of the optical system now moves past an object, the accuracy of the captured object, scene or the like is further increased. A realistic three-dimensional image can then be calculated using familiar methods such as evaluation methods known as "Structure from Motion".

Particularly advantageous for this are nearby items or objects, which can then be captured with high resolution. An exposure pattern, for example, can be provided with one or more wavelengths in the near-infrared range. The near infrared range includes wavelengths between 780 nm and 3 μm. Preferably, a wavelength of 850 nm is used. This avoids disturbing effects in the visible area due to the projection of the pattern.

FIG. 9 shows parts of an optical system according to another embodiment of the present invention.

FIG. 9 shows a schematic arrangement of an optical system 1 in the form of a three-dimensional projection glass 4 for several persons—indicated by three pairs of eyes AN1, AN2, AN3. All eyes (pairs) AN1, AN2, AN3 are irradiated or detected by a projection/detection unit 2, 3. The volume hologram set 5 is designed here as a window or projection glass. Additional elements such as double or triple glazing can also be integrated. In addition, an overview camera 17b is arranged in the area of the projection glass, which can roughly determine the eye position of the eyes AN1, AN2, AN3 in advance. The projection glass 4 according to FIG. 9 allows the projection of a three-dimensional image for several users. A single projection/detection unit 2, 3 is sufficient, which can provide a finer resolution than that of the spectacles according to FIG. 8, since not only the eye position and the eye position state for one eye but for several eyes AN1, AN2, AN3 must be maintained and detected.

The method for determining the eye rotation as described in FIG. 7 can also be transferred to a 3D projection surface on which several eyes (including persons) are looking. In this case, the detection unit 3 must be larger than the dimensions of a pair of glasses, as the angles have to be resolved finer due to the larger distances. Likewise, the lateral offset of a particular eye relative to the center of the projection surface is much larger, which also influences the size of the detection device 3. The multiple eye position states can be determined in the same way as with glasses.

With a 3D projection surface, the position of the eyes should preferably be determined before their eye position states—i.e., angles—can be "traced" from this starting position. Likewise, for example, a person can briefly turn his head away and then want to be able to follow the scenes directly again. These can be determined alone or in combination using the following methods or devices:

Observation by external camera 17b, which determines the coarse position of the—eyes—not necessarily their angles of rotation.

Guiding laser beam from projection device 2, which scans a large area laterally and can determine the exact eye position and rotation when a signal is detected in fine mode. In order to make the light stimulus as small as possible, the pulse duration can be very small (e.g., in the μs range, for example between 1-100 μs) and/or only in the red spectral range. When scenes are running, the guiding laser beam is then replaced by the image information beam. But it would also be conceivable to fade in the guiding beam again and again.

FIG. 10 shows different perception areas of an eye.

In FIG. 10 the two-dimensional field of view of an eye AN is shown in schematic form. Furthermore, three different areas W1, W2, W3—perception areas—are shown as examples, in which the eye perceives image information in different resolution and/or contrast. The eye perceives image information especially in the area W1—this is particularly relevant for reading. In the second area W2, the eye perceives spatial information in lower resolution. From this, the eye only perceives fast movements in the area W3 and in low resolution.

Accordingly, the projection/detection unit 2, 3 has to project very little information here. Of course, the different perception areas W1, W2, W3 change depending on the viewing direction of the eye, or they swivel as the eye moves or changes direction accordingly.

In summary, the advantage of this invention is, among other things, that it enables a complete three-dimensional representation with simultaneous ease of implementation and a high degree of flexibility, both with regard to implementation and the corresponding application.

Although this invention has been described using preferred design examples, it is not limited to this, but can be modified in many ways.

LIST OF REFERENCE NUMBERS

1 Optical System
2 Projection device
3 Eye detecting device
4 imaging device
N User
AN Eye User
5, 5a, 5c' Hologram-Set
5b, 5d, Hologram-Set, angle-boosting
5c Hologram-Set, reflective
6 Projector
W1, W2, W3 Perceptual range(s)
8 Optical waveguide
9 Beam splitter
10 Projection beam path
11 Detection beam length
12 Aperture projection device
13 Amplitude/phase modulator
14 Lens
15 Reflection element
17a, 17b Cameras
18 Laser beams
19 Processing equipment
21 Virtual Light Source/Virtual Point(s)
22 Beamlet
22' Total Beam Beamlets
23 Object point
24a,24b Microlens array
25 Laser light source
26 Segment

The invention claimed is:

1. An optical system for forming a two- or three-dimensional image, comprising:
a projection device for optically transmitting image information to a user;
an eye detecting device; and
an imaging device for imaging the image information of the projection device for the perception by the user, whereby, the imaging device comprises two or more optical hologram sets, wherein
at least one of the optical hologram sets is an angle-amplifying optical hologram set and comprises at least two holograms arranged to provide angular amplification,
at least one of the optical hologram sets is angle-amplifying-neutral, and wherein
at least one of the optical hologram sets is at least partially transmitting and/or at least partially reflecting,
wherein by means of the projection device,
at least one virtual point light source is generated or a plurality of virtual point light sources are generated such that they form at least one optical wavefront,
wherein the at least one virtual point light source or the plurality of virtual point light sources can each be generated by superimposing at least two coherent light waves in a region of the angle-amplifying optical hologram set,
wherein by means of the optical hologram sets, the at least one virtual point light source or the at least one optical wavefront is configured to be imaged directly onto a retina of an eye of the user, and
wherein the respective movements of eyes of the user can be detected by means of the eye detection device, and the eye detection device cooperates with the projection device in such a way that the amount of image information is adapted according to a respective eye direction and/or eye position in different perception regions of the respective eye.

2. The optical system according to claim 1, wherein an aperture of the projection device and/or detection device is smaller than 10 mm.

3. The optical system according to claim 1, wherein the projection device comprises at least one amplitude and/or phase modulator or a plurality of modulators arranged together in a module.

4. The optical system according to claim 1, wherein the imaging device comprises three optical hologram sets, wherein two of the three optical hologram sets are predominantly transmitting optical hologram sets, wherein one of the two predominantly transmitting optical hologram sets is the angle-amplifying optical hologram set, and wherein a third one of the three optical hologram sets is predominantly reflecting.

5. The optical system according to claim 4, wherein the three optical hologram sets are arranged sequentially one behind the other in a viewing direction of the user, and wherein the angle-amplifying optical hologram set is arranged between the two other optical hologram sets.

6. The optical system according to claim 1, wherein the at least two holograms of the angle-amplifying optical hologram set are arranged at least partially one within the other.

7. The optical system according to claim 1, wherein at least one of the optical hologram sets comprises a plurality of holograms which are arranged segmentally side by side and/or continuously extending in a lateral direction perpendicular to a viewing direction of the user in a plane in which an imaginary line of communication lies between the two eyes of the user and a straight-line viewing direction of the user.

8. The optical system according to claim 7, wherein the angle-amplifying optical hologram set is homogeneous in at least one lateral direction.

9. The optical system according to claim 1, wherein the at least one of the optical hologram sets that is at least partially transmitting and/or at least partially reflecting is an at least partially reflective optical hologram set, and comprises one or more holograms formed segmentally as a planar or curved reflective phase surface.

10. The optical system according to claim 1, wherein the projection device is designed to transmit image information by means of at least three different wavelengths, the optical hologram sets including at least three optical hologram sets arranged so as to correspond with the at least three different wavelengths, the at least three optical hologram sets being at least partially nested, interleaved or superposed with respect to each other.

11. The optical system according to claim 1, wherein at least one angle-amplifying optical hologram is arranged per lateral direction.

12. The optical system according to claim 1, wherein the eye detection device comprises one or more cameras for detecting and/or monitoring the position and/or direction of the eyes of the user.

13. The optical system according to claim 1, wherein the optical system is formed as spectacles, the imaging device being arranged in at least one lens of the spectacles.

14. The optical system according to claim 1, wherein the optical system comprises at least one camera for taking environmental images.

15. The optical system according to claim 14, wherein a processing device cooperates with the projection device and the imaging device such that evaluated environmental images are at least partially superimposable according to a viewing direction of the user with an environmental region visible through a transparent region of the imaging device.

16. The optical system according to claim 15, wherein the image information can be provided in the form of marking information for an object, so that by means of the processing device an object viewed by means of the optical system can be identified by means of the images and the marking information can be virtually depicted for the user correspondingly on the object as an overlay.

17. The optical system according to claim 1, further comprising a dimmer so that the degree of transparency of the imaging device is adjustable.

18. An optical system according to claim 1, wherein the number of coherent light waves for generating the at least one virtual point light source of the plurality of virtual point light sources is odd.

19. A method of forming a two- or three-dimensional image by means of an optical system comprising
 a projection device for optically transmitting image information to a user,
 an eye detection device, and
 an imaging device for imaging the image information of the projection device for the perception by the user,
wherein the imaging device comprises two or more optical hologram sets, wherein
 at least one of the optical hologram sets is an angle-amplifying optical hologram set and comprises at least two holograms arranged to provide angular amplification,
 at least one of the optical hologram sets is angle-amplifying-neutral, and wherein,
 at least one of the optical hologram sets is at least partially transmitting and/or at least partially reflecting, and
wherein by means of the projection device,
 at least one virtual point light source or
 a plurality of virtual point light sources are generated such that they form at least one wavefront, the method comprising:
generating the at least one virtual point light source or the plurality of virtual point light sources by superimposing at least two coherent light waves in a region of the angle-amplifying optical hologram set;
imaging, by means of the optical hologram sets, the at least one virtual point light source or the at least one optical wavefront directly onto a retina of an eye of the user; and
detecting the respective movements of eyes of the user by the eye detection device and adjusting the amount of image information according to a respective eye direction and/or eye position in different perception regions of the respective eye.

\* \* \* \* \*